3,065,063
IGNITION RODS INTENDED TO BE LIT AND
EXTINGUISHED REPEATEDLY
Folke Knut Knutsson-Hall, 34 Strandvagen,
Falkenberg, Sweden
No Drawing. Filed Jan. 29, 1957, Ser. No. 636,854
Claims priority, application Sweden Jan. 30, 1956
1 Claim. (Cl. 44—42)

In preparing ignition rods, which are to be ignited and extinguished repeatedly, for example by striking against a friction surface, containing for example amorphous phosphorus, polymerisable aldehydes and the like are generally used as combustion supporting agents for the flame. Examples of such igniting rods or matches are described in U.S. Patent 2,568,285.

Aldehydes, and especially metaldehyde, are of such a kind that they upon combustion give a steady flame well fitted for its purpose. If a burning ignition rod which contains metaldehyde is extinguished, for example blown out, the burning portion of the ignition rod is cooled, the result being that some sublimated aldehyde is condensed, whereby the ambient air will be mixed up with dust of condensed or crystallized aldehyde.

In order to avoid this a small amount of an organic acid, usually an aromatic carboxylic acid, such as phthalic acid, benzoic acid and the like, may be added to the mass of the rod. Said organic acids shall be solid at room temperature. Then the acid has such a property that it depolymerizes the aldehyde, for example the metaldehyde, at the combustion, so that, during the combustion, the aldehyde is slowly transferred to that compound from which it has been produced by polymerisation. As far as metaldehyde is concerned, it is transferred at the combustion to acetaldehyde and the like. Through this the advantage is gained that the ignition rods can be extinguished without the ambient air being mixed with dust, of, for example, metaldehyde.

However, the above-mentioned addition of acid involves above all the disadvantage that the depolymerization of the aldehyde by the acid can start within the rod itself, before the rod is ignited. This applies above all to higher ambient temperatures, and it has been found that this depolymerization increases with increased temperature, the result being that the ignition rods under certain conditions cannot remain intact for example in the tropics. Tests have shown that above all a longer storing time at higher temperatures results in decomposition of the mass of the rod, whereby the ignition rod as a whole will be useless for a shorter or longer period.

Now it has appeared that if, in addition to the depolymerizing organic acid, toluidine is also added, a depolymerization or decomposition of polymeric aldehydes and the like is prevented even at temperatures occurring in the tropics. However, the polymerization caused by the organic acid in the flame itself, that is, in that part of the rod that is burning, is not prevented.

Further it has appeared that p-toluidine, which is solid, is particularly fitted for the purpose. By adding the latter the advantage is gained that the ignition rods can burn in the usual way, without formation of dust or the like of condensed polymerized aldehyde at cooling, for example when the flame of the burning ignition rod is extinguished.

As an example may be mentioned that for 1000 g. of metaldehyde only about 10 g. of p-toluidine and a corresponding amount of a solid organic acid, for example phthalic anhydride or benzoic acid, are required. Accordingly as the ignition rods shall be protected against the action of different high temperatures the amount of acid and toluidine can be increased or decreased.

Due to the fact that the organic acid contained in the ignition rod is bound by toluidine the advantage is also obtained, that the ignition rods, after the manufacture, when they still contain solvents and the like, can be dried rapidly at a rather high temperature without being damaged or decomposed.

*Example*

An ignition rod according to the invention is prepared in the following manner: An inner core is prepared from a mass, which is easily ignited when struck against a friction surface, containing for example amorphous phosphorus. This inner core is surrounded by an outer mass which in turn is ignited by the spark obtained when the inner mass strikes against the friction surface. Thus, the outer mass only serves to maintain the flame and cannot be lit when striking against the friction surface. The two masses are pressed together, so that a rod is formed in which the inner mass forms the central portion and the outer mass the surrounding portion. Furthermore the outer means of the rod can be coated with a thin layer of a difficultly combustible substance, for example a film of cellulose acetate or the like, in order to prevent the flame from spreading along the sides of the rod. The inner mass may for example consist of:

| | Percent by weight |
|---|---|
| Potassium chlorate or sodium chlorate | 60 |
| Cellulose acetate | 20 |
| Metaldehyde | 16 |
| Phthalic acid | 2.8 |
| p-Toluidine | 1.2 |

The outer mass may for example consist of:

| | Percent by weight |
|---|---|
| Cellulose nitrate | 25 |
| Metaldehyde | 65 |
| Phthalic acid | 7 |
| p-Toluidine | 3 |

What I claim is:

An ignition rod adapted to be ignited and extinguished again and again comprising in combination: an inner core consisting of material which is easily ignited when the rod is struck against a friction surface, and a surrounding outer mass ignitable by the inner core to maintain the flame, but not directly ignitable by the frictionally induced heat, the outer mass having a coating of cellulose nitrate and consisting essentially by weight of cellulose nitrate 25%, metaldehyde 65%, phthalic acid 7%, and p-toluidine 3% and the inner core consisting essentially by weight of a chlorate chosen from the group of potassium chlorate and sodium chlorate 60%, cellulose acetate 20%, metaldehyde 16%, phthalic acid 2.8% and p-toluidine 1.2%.

References Cited in the file of this patent

UNITED STATES PATENTS

| 1,763,326 | Reed | June 10, 1930 |
| 1,971,329 | Calcott | Aug. 28, 1934 |
| 2,130,078 | Evans | Sept. 13, 1938 |
| 2,568,285 | Hall | Sept. 18, 1951 |